No. 732,817. PATENTED JULY 7, 1903.
O. O. BAHLE.
BOLT.
APPLICATION FILED MAY 12, 1902.
NO MODEL.
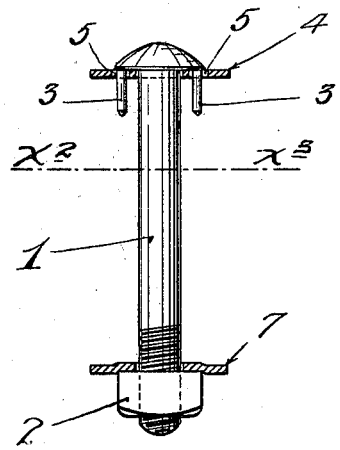
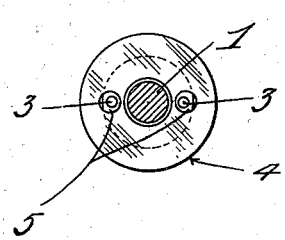
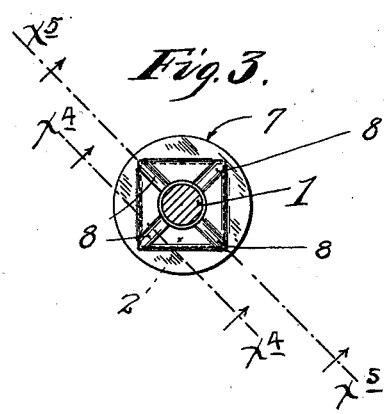
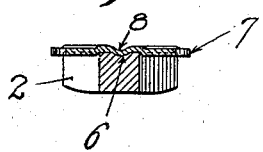
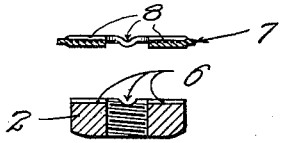
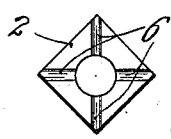
Witnesses.
H. D. Kilgore
A. U. Opsahl
Inventor:
Ole O. Bahle.
By his Attorneys,
Williamson Merchant No. 732,817.

Patented July 7, 1903.

UNITED STATES PATENT OFFICE.

OLE O. BAHLE, OF FERGUS FALLS, MINNESOTA.

BOLT.

SPECIFICATION forming part of Letters Patent No. 732,817, dated July 7, 1903.

Application filed May 12, 1902. Serial No. 106,873. (No model.)

*To all whom it may concern:*

Be it known that I, OLE O. BAHLE, a citizen of the United States, residing at Fergus Falls, in the county of Ottertail and State of Minnesota, have invented certain new and useful Improvements in Bolts; and I do hereby declare the following to be a full, clear, and exact description of the invention, such as will enable others skilled in the art to which it appertains to make and use the same.

My invention has for its object to provide means for preventing bolts from turning when screwing nuts onto the same and for preventing nuts from becoming accidentally loosened.

To the above ends the invention consists of the novel devices and combinations of devices hereinafter described, and defined in the claims.

The invention is illustrated in the accompanying drawings, wherein like characters indicate like parts throughout the several views.

Figure 1 is a view principally in plan, but with some parts in section, showing a bolt, a nut, and coöperating washers and embodying the features of my invention. Figs. 2 and 3 are transverse sections on the line $x^2\ x^3$ of Fig. 1, the former looking toward the head and the latter looking toward the nut end of the said bolt. Fig. 4 is a section on the line $x^4\ x^4$ of Fig. 3. Fig. 5 is a section through the nut and its coöperating washer on the line $x^5\ x^5$ of Fig. 3, the said parts being shown as separated; and Fig. 6 is a plan view of the nut looking at the inner face thereof.

The numeral 1 indicates a bolt and the numeral 2 a nut, both of ordinary construction except as hereinafter specified. Anchoring brads or pins 3 project from the head of the bolt from diametrically opposite sides thereof and extend parallel with the bolt, or, in other words, longitudinally thereof. A washer 4, which coöperates with the head of the bolt and normally lies against the same, is provided with small perforations 5 at diametrically opposite points, through which the anchoring pins or brads 3 are adapted to project, as best shown in Fig. 1.

The nut 2 on its inner face is provided with radial grooves 6, which preferably extend to the corners of the bolt, as best shown in Fig. 6. The washer 7, which coöperates with the nut 2, is slightly depressed to fit the inner face of the nut and is provided with radial ribs 8, which are adapted to fit the grooves 6 of said nut 2 and prevent the same from being accidentally turned by jars or other light forces.

As is evident, this bolt is especially designed for use in connection with woodwork or timbers or other soft materials, into which the anchoring pins or brads 3 may be pressed when the nut is tightened or when the bolt is driven to thereby anchor the said bolt against rotary movements.

The device described is simple, efficient, and of small cost, and it may of course be somewhat modified within the scope of my invention as herein set forth and claimed.

What I claim, and desire to secure by Letters Patent of the United States, is as follows:

1. The combination with a bolt, the head of which is provided with one or more anchoring pins or brads projecting longitudinally of the bolt, of a washer perforated to pass the said anchoring pin or brad, substantially as described.

2. The combination with a bolt, the head of which is provided at diametrically opposite points with pins or brads projecting longitudinally of the bolt, a washer having perforations through which said anchoring pins or brads may project, substantially as described.

In testimony whereof I affix my signature in presence of two witnesses.

OLE O. BAHLE.

Witnesses:
 A. B. ERICKSON,
 KNUT P. BAHLE.